United States Patent
Miller, Jr.

(10) Patent No.: US 7,155,792 B1
(45) Date of Patent: Jan. 2, 2007

(54) HAND RATCHET QUICK RELEASE BRAKE PAD SPREADER TOOL

(76) Inventor: Kelly Miller, Jr., 20158 Ash La., Lynwood, IL (US) 60411

( * ) Notice: Subject to any disclaimer, the term of this patent is extended or adjusted under 35 U.S.C. 154(b) by 0 days.

(21) Appl. No.: 11/254,174

(22) Filed: Oct. 19, 2005

(51) Int. Cl.
*B23P 19/04* (2006.01)

(52) U.S. Cl. ....................................... 29/239

(58) Field of Classification Search ................. 29/239, 29/266; 269/6; 259/108
See application file for complete search history.

(56) References Cited

U.S. PATENT DOCUMENTS

| | | | |
|---|---|---|---|
| 3,705,581 A | * | 12/1972 | Drake .......................... 29/239 |
| 3,727,490 A | | 4/1973 | Diffenderfer et al. |
| 4,086,828 A | | 5/1978 | Mader |
| 6,138,531 A | | 10/2000 | Lamons |
| 6,378,185 B1 | | 4/2002 | Ratchovsky et al. |
| 2004/0134052 A1 | | 7/2004 | Ploeger et al. |

* cited by examiner

*Primary Examiner*—Robert C. Watson
(74) *Attorney, Agent, or Firm*—Richard L. Miller

(57) ABSTRACT

A hand ratchet quick release brake pad spreader tool that is a hand tool for spreading a disc brake pad connected to a piston in a caliper housing, thereby compressing the piston into the caliper housing. The hand tool consists of a shaft having a ram affixed onto a front end that slidably extends through a central aperture in a frame member and a central through bore in a backing plate that is mounted to a forward end of the frame member. A trigger handle is pivotally affixed to the frame member adjacent to a depending fixed handle on the frame member. A mechanism is for moving the shaft forwards when the trigger handle is squeezed towards the fixed handle by a hand of a person. A mechanism is for holding the shaft stationary thereby preventing the shaft from moving backwards when the trigger handle is released.

8 Claims, 3 Drawing Sheets

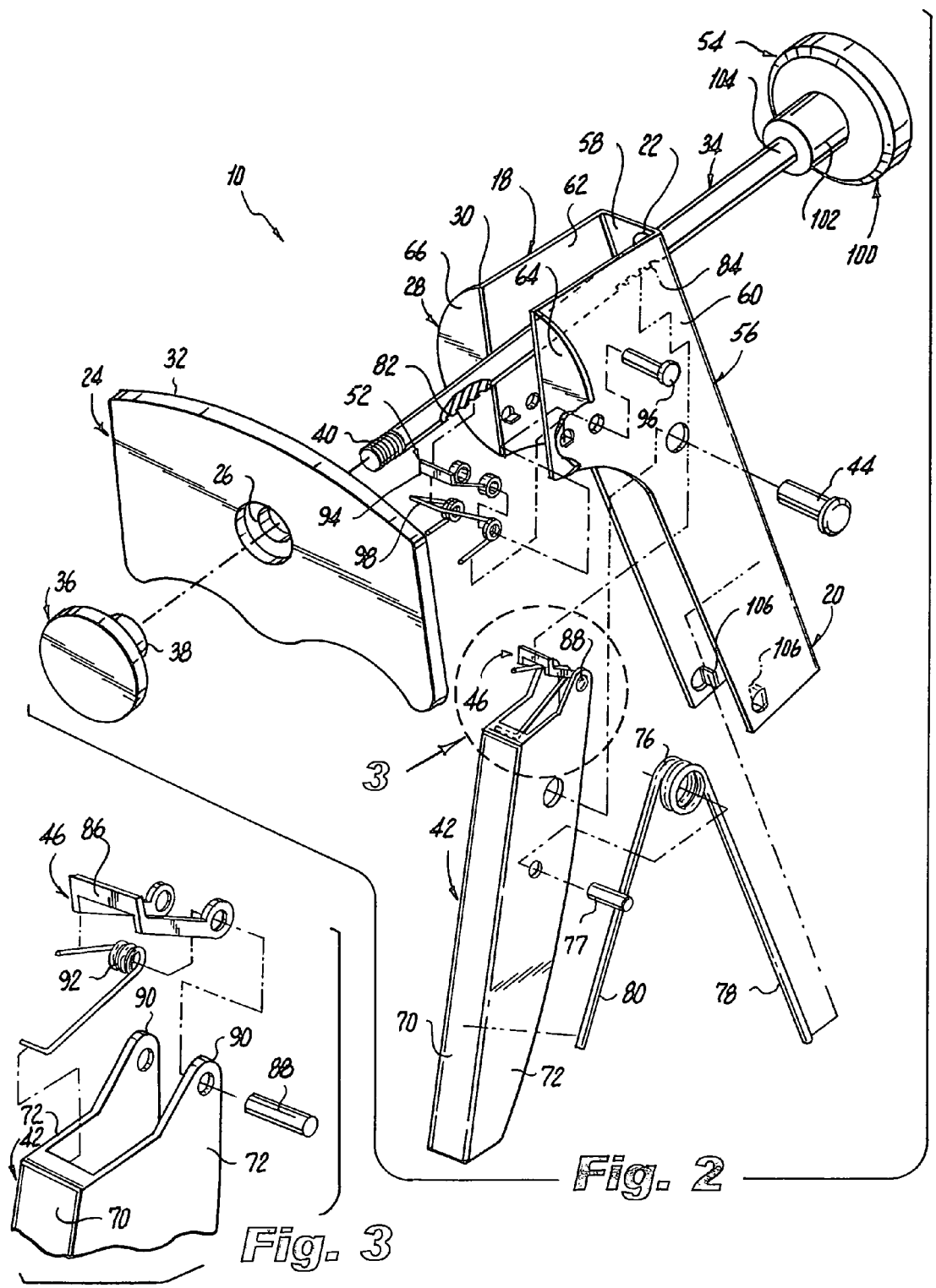

US 7,155,792 B1

HAND RATCHET QUICK RELEASE BRAKE PAD SPREADER TOOL

BACKGROUND OF THE INVENTION

1. Field of the Invention

The present invention relates to a disc brake pad spreader, and more particularly, a hand ratchet quick release brake pad spreader tool.

2. Description of the Prior Art

Numerous innovations for hand tools have been provided in the prior art that will be described. Even though these innovations may be suitable for the specific individual purposes to which they address, however, they differ from the present invention.

A FIRST EXAMPLE, U.S. Pat. No. 3,727,490, Issued on Apr. 17, 1973, to Diffenderfer et al. teaches a spreading tool particularly adapted for use with disc brakes, as for example of automobiles, trucks and the like, wherein the spreader is a hand-actuable tool for insertion between the brake shoes or pads mounted in a caliper, for spreading the same, for allowing placement of the shoes over a rotor, or removal of the same from a rotor. The tool uses one or more X-shaped linkages, commonly pivotal about a shaft or axis, upon rotation of the tool handle, which actuates a drive screw, that in turn, cams linkage legs apart.

A SECOND EXAMPLE, U.S. Pat. No. 4,086,828, Issued on May 2, 1978, to Mader teaches a manually-operable tool for insertion between the inboard and outboard caliper-mounted disc brake pads for the purpose of spreading the pads to facilitate placement over the rotor. The tool employs a screw having an elongated partially-threaded shank and a handle at the rearward end for manually rotating the screw about its axis. Supported on a non-threaded portion of the screw shank is a pivot-stud body having pivot studs extending laterally in opposite directions. Supported on the pivot studs, on each side of the screw shank, is a pair of scissor-like jaw levers or spreaders. Supported for sliding movement on the screw shank rearward of the pivot-stud body, i.e., between the pivot-stud and the shoulder of the handle, is a shoulder-stud body having camming studs extending laterally in opposite directions into the rearward jaw openings of the scissor-like spreaders. Threaded on the screw shank forward of the pivot-stud body is a shoulder-nut body having camming studs extending laterally in opposite directions into the forward jaw openings of the spreaders. When the screw is turned in a proper direction, the forward and rearward sets of camming studs are moved toward each other into the crotches of the scissor-like spreaders to spread both pairs of spreaders, thereby to spread, or to maintain at spaced separations, the inboard and outboard disc brake pads.

A THIRD EXAMPLE, U.S. Pat. No. 6,138,531, Issued on Oct. 31, 2000, to Lamons teaches a hand ratchet wrench with opposed parallel sides which permits utilization of a fixed jaw or adjustable wrench for driving difficult work pieces. In addition, the hand ratchet is provided with a mechanism that permits quick release from socket bits and reversal of the ratcheting mechanism. Finally, an optional hand piece is provided which engages the hand ratchet with detents, to facilitate use of the hand ratchet as a speed wrench.

A FOURTH EXAMPLE, U.S. Pat. No. 6,378,185 B1, Issued on Apr. 30, 2002, to Ratchovsky et al. teaches a hand tool for use in servicing automotive-type disc brakes, and particularly for retracting the brake piston into its associated caliper. The hand tool include a pair of spreader plates which have a first position in which they are closely proximate one another, and a second position in which they are spread sufficiently to force a brake piston into its caliper body. The spreader plates have extended portions which are shaped and sized to extend into the caliper in the place of the disc pads which normally reside in the caliper. A hydraulic actuator interconnects the spreader plates, and is operated by a trigger-like mechanism. In operation the extended portions of the spreader plates are inserted into the caliper, and the trigger operated to drive a movable plate with respect to a fixed plate, utilizing the force of the hydraulic cylinder to spread the plates and thereby force the brake piston back into its caliper.

A FIFTH EXAMPLE, U.S. Patent Office Document No. 2004/0134052 A1, Published on Jul. 15, 2004, to Ploeger et al. teaches a tool for spreading brake pads and for compressing the piston of a disc brake assembly of the type including a disc brake caliper housing for the pads and piston. The tool includes manually operated handles which drive a rod attached to a plunger that engages one of the disc brake pads. The housing for the tool includes a backing plate which is engaged against the second pad. The backing plate and plunger are driven in a manner which causes them to become spaced from one another. A mechanical advantage is achieved by utilization of handles with a lever arm extension associated with a pivotal handle.

It is apparent now that numerous innovations for hand tools have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a hand ratchet quick release brake pad spreader tool that avoids the disadvantages of the prior art.

ANOTHER OBJECT of the present invention is to provide a hand ratchet quick release brake pad spreader tool that is simple and inexpensive to manufacture.

STILL ANOTHER OBJECT of the present invention is to provide a hand ratchet quick release brake pad spreader tool that is simple to use.

BRIEFLY STATED, STILL YET ANOTHER OBJECT of the present invention is to provide a hand ratchet quick release brake pad spreader tool that is a hand tool for spreading a disc brake pad connected to a piston in a caliper housing, thereby compressing the piston into the caliper housing. The hand tool consists of a shaft having a ram affixed onto a front end that slidably extends through a central aperture in a frame member and a central through bore in a backing plate that is mounted to a forward end of the frame member. A trigger handle is pivotally affixed to the frame member adjacent to a depending fixed handle on the frame member. A mechanism is for moving the shaft forwards when the trigger handle is squeezed towards the fixed handle by a hand of a person. A mechanism is for holding the shaft stationary thereby preventing the shaft from moving backwards when the trigger handle is released. The shaft will always travel forwards until the ram makes contact with the disc brake pad and the backing plate makes contact with one side of the caliper housing, thereby compressing the piston into the caliper housing. A mechanism is for disengaging the shaft from the moving mechanism and the holding mechanism, so that the shaft can be manually pulled backwards to release the ram away from the disc brake pad.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 2 is a partial exploded diagrammatic front perspective view of the present invention showing the cooperation between internal parts in greater detail;

FIG. 3 is an enlarged exploded diagrammatic front perspective view, with parts broken away, of the area enclosed in the dotted curve indicated by arrow 3 in FIG. 2;

Figure 1:
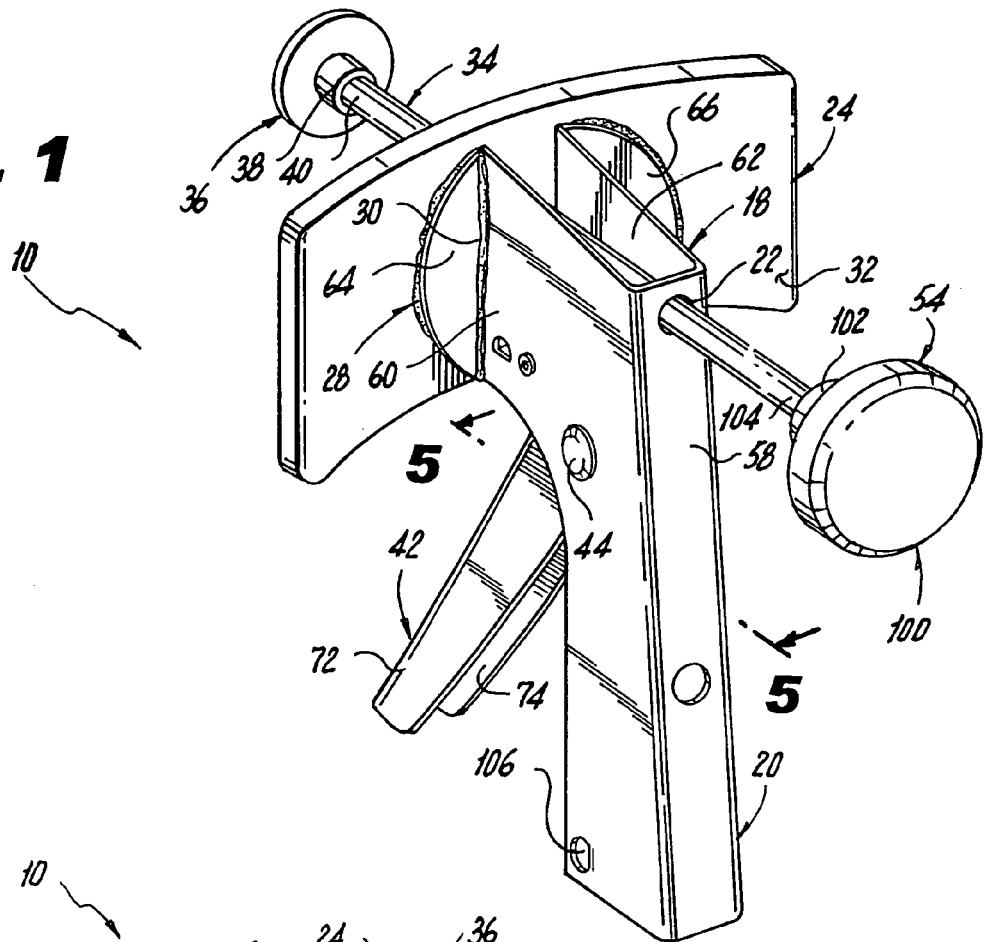
FIG. 1 is a diagrammatic rear perspective view of the present invention.

A MARSHALLING OF REFERENCE NUMERALS UTILIZED IN THE DRAWING 10 hand tool
12 disc brake pad on piston 14
14 piston in caliper housing 16
16 caliper housing
18 frame member of hand tool 10
20 fixed handle on frame member 18
22 central aperture in frame member 18
24 backing plate of hand tool 10
26 central through bore in backing plate 24
28 mounting structure of hand tool 10
30 forward end of frame member 18
32 rear surface of backing plate 24
34 shaft of hand tool 10
36 ram of hand tool 10
38 collar of ram 36
40 front end of shaft 34
42 trigger handle of hand tool 10
44 pin for trigger handle 42
46 moving mechanism of hand tool 10
48 hand of person 50
50 person 50
52 holding mechanism of hand tool 10
54 disengaging mechanism of hand tool 10
56 U-shaped housing of frame member 18
58 rear wall of U-shaped housing 56
60 first side wall of U-shaped housing 56
62 second side wall of U-shaped housing 56
64 first flange of mounting structure 28
66 second flange of mounting structure 28
68 U-shaped structure of trigger handle 42
70 front wall of U-shaped structure 68
72 first side wall of U-shaped structure 68
74 second side wall of U-shaped structure 68
76 spring of trigger handle 42
77 pin for spring 76
78 first elongated leg of spring 76
80 second elongated leg of spring 76
82 longitudinal rack of shaft 34
84 rearwardly sloping teeth of longitudinal rack 82
86 first pawl member of moving mechanism 46
88 first pin of moving mechanism 46
90 extended upper end of trigger handle 42
92 first spring of moving mechanism 46
94 second pawl member of holding mechanism 52
96 second pin of holding mechanism 52
98 second spring of holding mechanism 52
100 quick release knob of disengaging mechanism 54
102 collar of quick release knob 100
104 back end of shaft 34
106 inwardly extending stop projection on first and second side walls 60, 62

DETAILED DESCRIPTION OF THE PREFERRED EMBODIMENT

Figure 4:
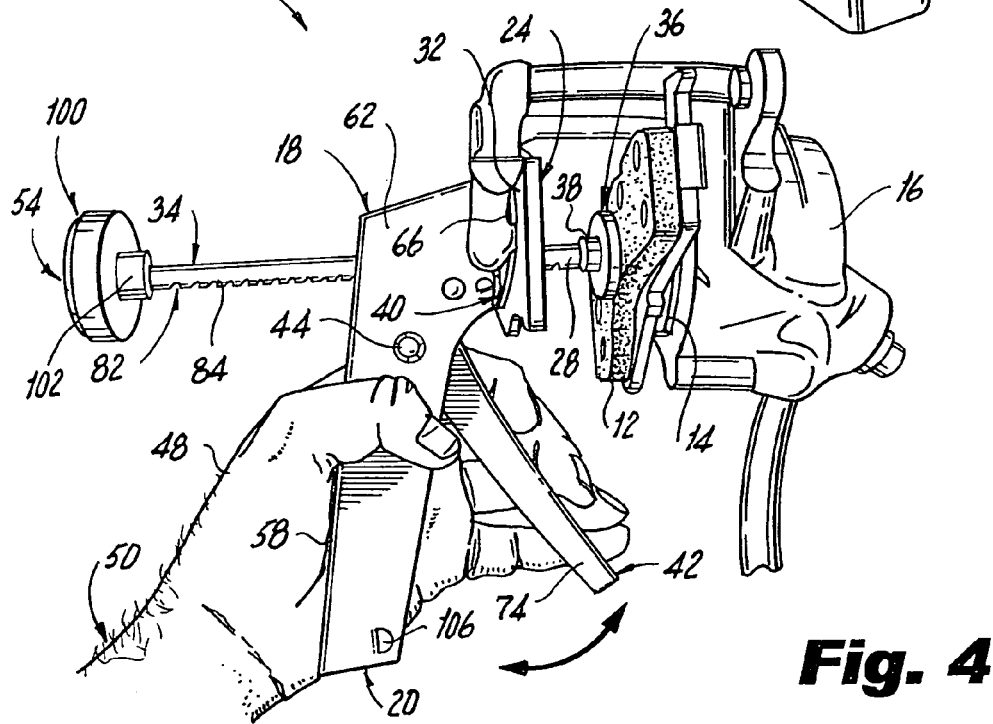
FIG. 4 is a diagrammatic side perspective view showing the present invention in use with a disc brake caliper.
Figure 5:
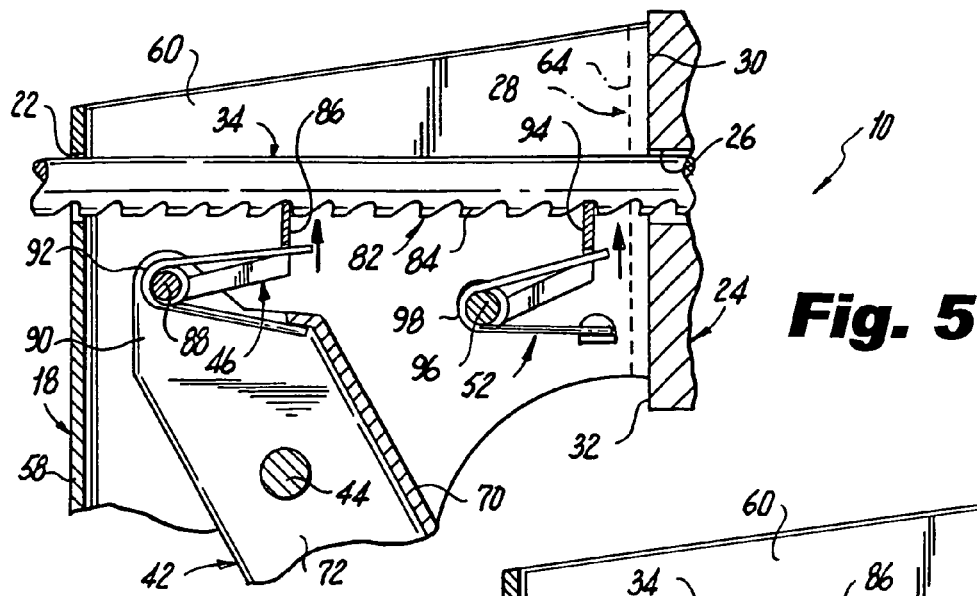
FIG. 5 is a diagrammatic cross sectional view, with parts broken away, taken on line 5—5 in FIG. 1, showing the relationship of the sloping teeth of the rack on the shaft with the dual pawl members, when the trigger handle is not squeezed.
Figure 6:
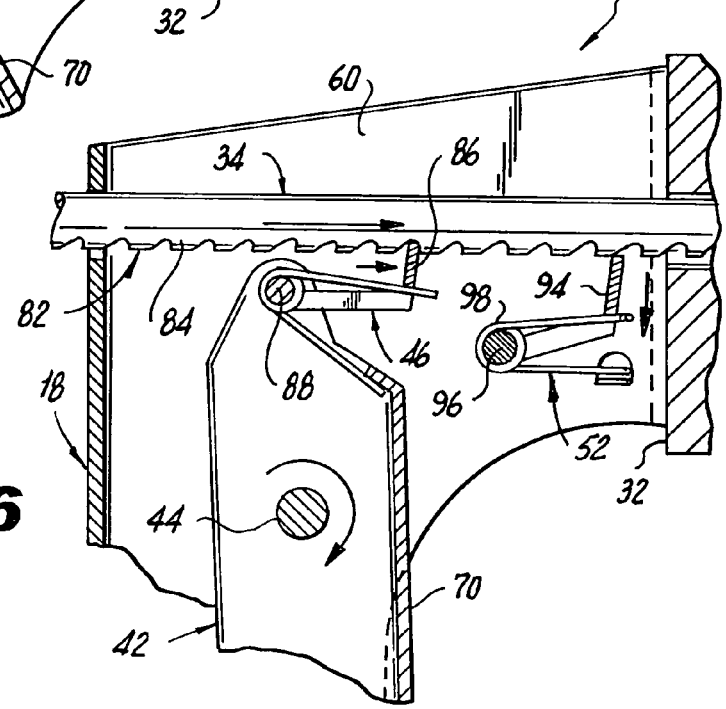
FIG. 6 is a diagrammatic cross sectional view, with parts broken away, similar to FIG. 5, showing the shaft being moved forwards when the trigger handle is squeezed.
Figure 7:
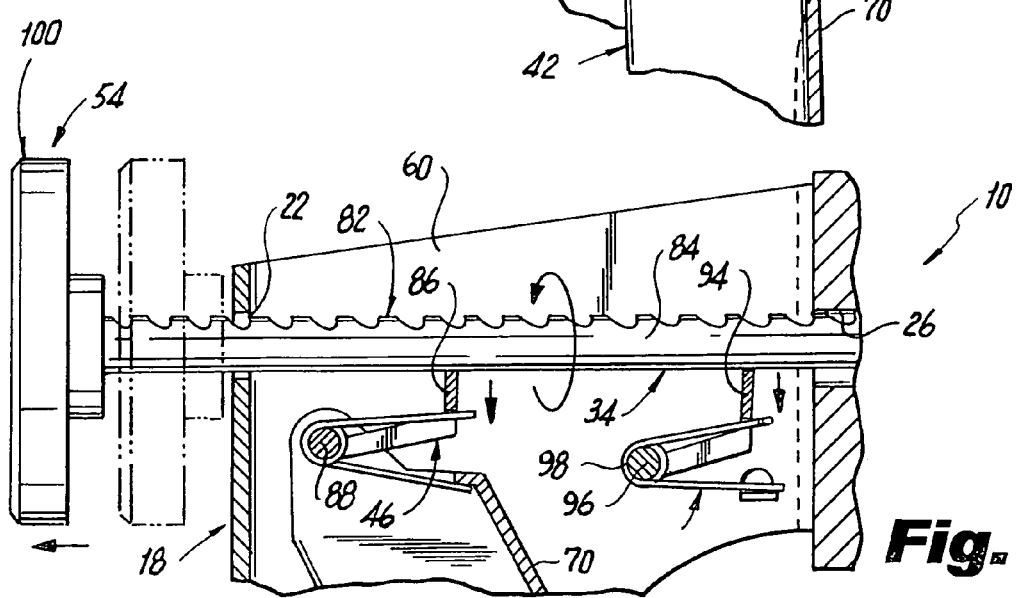
FIG. 7 is a diagrammatic cross sectional view, with parts broken away, similar to FIG. 6, showing the shaft rotated with the sloping teeth of the rack disengaged from the dual pawl members, so that the shaft can now be manually pulled backwards.

Referring now to the FIGS. 1 through 7, in which like numerals indicate like parts, the invention is a hand tool 10 for spreading a disc brake pad 12 connected to a piston 14 in a caliper housing 16, thereby compressing the piston 14 into the caliper housing 16. The hand tool 10 consists of a frame member 18 with a depending fixed handle 20. The frame member 18 has a central through bore 26. A structure 18 is for mounting a forward end 30 of the frame member 18 to a rear surface 32 of the backing plate 24, so that the central aperture 22 in the frame member 18 is in alignment with the central through bore 26 in the backing plate 24. A shaft 34 slideably extends through the central aperture 22 in the frame member 18 and the central through bore 26 in the backing plate 24.

A ram 36 has a collar 38 affixed onto a front end 40 of the shaft 34 in opposed relation to the backing plate 24. A trigger handle 42 is pivotally affixed by a pin 44 to the frame member 18 adjacent to the fixed handle 20. A mechanism 46 is for moving the shaft 34 forwards when the trigger handle 42 is squeezed towards the fixed handle 20 by a hand 48 of a person 50. A mechanism 52 is for holding the shaft 34 stationary, thereby preventing the shaft 34 from moving backwards when the trigger handle 42 is released. When the trigger handle 42 is continuously squeezed and released the shaft 34 will always travel forwards until the ram 36 makes contact with the disc brake pad 12 and the backing plate 24 makes contact with one side of the caliper housing 16, thereby compressing the piston 14 into the caliper housing 16. A mechanism 54 is for disengaging the shaft 34 from the moving mechanism 46 and the holding mechanism 52, so that the shaft 34 can be manually pulled backwards to release the ram 36 away from the disc brake pad 12.

The frame member 18 with the depending fixed handle 20 is a generally U-shaped housing 56 having a rear wall 58 and a pair of side walls 60, 62 in which the central aperture 22 is in an upper end of the rear wall 58. The mounting structure 28 includes a pair of flanges 64, 66, in which each flange 64, 66 is bent outwardly from one side wall 60, 62 of the U-shaped housing 56 and then affixed to the rear surface 32 of the backing plate 24. The trigger handle 42 is a generally U-shaped structure 68 having a front wall 70 and a pair of side walls 72, 74.

The trigger handle 42 includes a spring 76 retained thereto by a pin 77. The spring 76 has a pair of elongated legs 78, 80, in which the first leg 78 engages with the rear wall 58 of the U-shaped housing 56 and the second leg 80 engages with the front wall 70 of the U-shaped structure 68, so that the spring 76 will normally bias the trigger handle 42 outwardly away from the fixed handle 20. The shaft 34 contains a longitudinal rack 82 formed therealong, having a plurality of rearwardly sloping teeth 84.

The moving mechanism 46 comprises a first pawl member 86. A first pin 88 pivotally connects the first pawl member 86 to an extended upper end 90 of the trigger handle 42. A first spring 92 on the first pin 88 is for biasing the first pawl member 86 upwardly away from the extended upper end 90 of the trigger handle 42, to engage with the rearwardly sloping teeth 84 of the rack 82 on the shaft 34.

The holding mechanism 52 consists of a second pawl member 94. A second pin 96 pivotally connects the second pawl member 94 within the frame member 18. A second spring 98 on the second pin 96 is for biasing the second pawl member 94 upwardly to engage with the rearwardly sloping teeth 84 of the rack 82 on the shaft 34. The disengaging mechanism 54 includes a quick release knob 100, having a collar 102 affixed onto a back end 104 of the shaft 34. The quick release knob 100 can rotate the shaft 34 to disengage the rearwardly sloping teeth 84 of the rack 82 away from the first pawl member 86 and the second pawl member 94, so that the shaft 34 can be manually pulled backwards by the quick release knob 100. Each side wall 60,62 of the U-shaped housing 56 of the frame member 18 has an inwardly extending stop projection 106 near a bottom end of the fixed handle 20, so as to make contact with the trigger handle 42 when the trigger handle 42 is squeezed by the hand 48 of the person 50.

It will be understood that each of the elements described above, or two or more together, may also find a useful application in other types of constructions differing from the types described above.

While the invention has been illustrated and described as embodiments of a hand ratchet quick release brake pad spreader tool, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A hand tool for spreading a disc brake pad connected to a piston in a caliper housing, thereby compressing the piston into the caliper housing, said hand tool comprising:
   a) a frame member with a depending fixed handle, said frame member having a central aperture therethrough;
   b) a backing plate having a central through bore;
   c) means for mounting a forward end of said frame member to a rear surface of said backing plate, so that said central aperture in said frame member is in alignment with said central through bore in said backing plate;
   d) shaft that slideably extends through said central aperture in said frame member and said central through bore in said backing plate;
   e) a ram having a collar affixed onto a front end of said shaft in opposed relation to said backing plate;
   f) a trigger handle pivotally affixed to said frame member adjacent to said fixed handle;
   g) means for moving said shaft forwards when said trigger handle is squeezed towards said fixed handle by a hand of a person;
   h) means for holding said shaft stationary, thereby preventing said shaft from moving backwards when said trigger handle is released, whereby when said trigger handle is continuously squeezed and released said shaft will always travel forwards until said ram makes contact with the disc brake pad and said backing plate makes contact with one side of the caliper housing, thereby compressing the piston into the caliper housing; and
   i) means for disengaging said shaft from said moving means and said holding means, so that said shaft can be manually pulled backwards to release said ram away from the disc brake pad, wherein said frame member with said depending fixed handle is a generally U-shaped housing having a rear wall and a pair of side walls, in which said central aperture is in an upper end of said rear wall, wherein said mounting means includes a pair of flanges, in which each said flange is bent outwardly from one said side wall of said U-shaped housing and then affixed to a rear surface of said backing plate.

2. The hand tool as recited in claim 1, wherein said trigger handle is a generally U-shaped structure having a front wall and a pair of side walls.

3. The hand tool as recited in claim 2, wherein said trigger handle includes a spring retained thereto, said spring having a pair of elongated legs, in which said first leg engages with said rear wall of said U-shaped housing and said second leg engages with said front wall of said U-shaped structure, so that said spring will normally bias said trigger handle outwardly away from said fixed handle.

4. The hand tool as recited in claim 1, wherein said shaft includes a longitudinal rack formed therealong having a plurality of rearwardly sloping teeth.

5. The hand tool as recited in claim 4, wherein said moving means comprises:
   a) a first pawl member;
   b) a first pin pivotally connecting said first pawl member to an extended upper end of said trigger handle; and
   c) a first spring on said first pin for biasing said first pawl member upwardly away from said extended upper end of said trigger handle to engage with said rearwardly sloping teeth of said rack on said shaft.

6. The hand tool as recited in claim 5, wherein said holding means comprises:
   a) a second pawl member;
   b) a second pin pivotally connecting said second pawl member within said frame member; and
   c) a second spring on said second pin for biasing said second pawl member upwardly to engage with said rearwardly sloping teeth of said rack on said shaft.

7. The hand tool as recited in claim 4, wherein said disengaging means includes a quick release knob having a collar affixed onto a back end of said shaft, wherein said quick release knob can rotate said shaft to disengage said rearwardly sloping teeth of said rack away from said first pawl member and said second pawl member, so that said shaft can be manually pulled backwards by said quick release knob.

8. A hand tool for spreading a disc brake pad connected to a piston in a caliper housing, thereby compressing the piston into the caliper housing, said hand tool comprising:
   a) a frame member with a depending fixed handle, said frame member having a central aperture therethrough;
   b) a backing plate having a central through bore;
   c) means for mounting a forward end of said frame member to a rear surface of said backing plate, so that said central aperture in said frame member is in alignment with said central through bore in said backing plate;
   d) shaft that slideably extends through said central aperture in said frame member and said central through bore in said backing plate;
   e) a ram having a collar affixed onto a front end of said shaft in opposed relation to said backing plate;
   f) a trigger handle pivotally affixed to said frame member adjacent to said fixed handle;
   g) means for moving said shaft forwards when said trigger handle is squeezed towards said fixed handle by a hand of a person;
   h) means for holding said shaft stationary, thereby preventing said shaft from moving backwards when said trigger handle is released, whereby when said trigger handle is continuously squeezed and released said shaft will always travel forwards until said ram makes contact with the disc brake said and said backing plate makes contact with one side of the caliper housing, thereby compressing the piston into the caliper housing; and
   i) means for disengaging said shaft from said moving means and said holding means, so that said shaft can be manually pulled backwards to release said ram away from the disc brake pad, wherein said frame member with said depending fixed handle is a generally U-shaped housing having a rear wall and a pair of side walls, in which said central aperture is in an upper end of said rear wall, wherein said trigger handle is a generally U-shaped structure having a front wall and a pair of side walls, further including each said side wall of said U-shaped housing of said frame member having an inwardly extending stop projection near a bottom end of said fixed handle, so as to make contact with said trigger handle when said trigger handle is squeezed by the hand of the person.

* * * * *